United States Patent
Gharbi

(10) Patent No.: US 11,800,865 B2
(45) Date of Patent: Oct. 31, 2023

(54) DEVICE AND PROCESS FOR PRESERVING AND TRANSPORTING AT LEAST ONE HUMAN OR ANIMAL TISSUE WITH A VIEW TO TRANSPLANTION OR EX-VIVO EXPERIMENTATION

(71) Applicants: UNIVERSITE DE FRANCHE COMTE, Besancon (FR); TISSUEAEGIS, Dijon (FR)

(72) Inventor: Tijani Gharbi, Besancon (FR)

(73) Assignees: UNIVERSITE DE FRANCHE COMTE, Besancon (FR); TISSUEAEGIS, Dijon (FR)

( * ) Notice: Subject to any disclaimer, the term of this patent is extended or adjusted under 35 U.S.C. 154(b) by 818 days.

(21) Appl. No.: 16/475,964

(22) PCT Filed: Jan. 9, 2018

(86) PCT No.: PCT/FR2018/050047
§ 371 (c)(1),
(2) Date: Jul. 3, 2019

(87) PCT Pub. No.: WO2018/127675
PCT Pub. Date: Jul. 12, 2018

(65) Prior Publication Data
US 2019/0350193 A1 Nov. 21, 2019

(30) Foreign Application Priority Data
Jan. 9, 2017 (FR) ...................................... 1750180

(51) Int. Cl.
*A01N 1/02* (2006.01)

(52) U.S. Cl.
CPC ........... *A01N 1/0273* (2013.01); *A01N 1/021* (2013.01); *A01N 1/0242* (2013.01); *A01N 1/0247* (2013.01); *A01N 1/0252* (2013.01)

(58) Field of Classification Search
CPC .... A01N 1/0273; A01N 1/021; A01N 1/0242; A01N 1/0247; A01N 1/0252
(Continued)

(56) References Cited

U.S. PATENT DOCUMENTS

| 2011/0014690 A1 | 1/2011 | Skelnik et al. |
| 2015/0231628 A1* | 8/2015 | Nozaki .................... B01L 3/508 53/473 |
| 2016/0029618 A1 | 2/2016 | Gain et al. |

FOREIGN PATENT DOCUMENTS

| EP | 2896685 A1 | 7/2015 |
| WO | WO-2014/140434 A1 | 9/2014 |

(Continued)

OTHER PUBLICATIONS

Universite de Franche, Comte: Retrieved from the Internet at <URL:https://actu.univ-fcomte.fr/article/ultra-haute-conservation-de-greffons-de-cornee-003320#.YQA3K45KguU> Apr. 13, 2016.
(Continued)

*Primary Examiner* — Michael L Hobbs
*Assistant Examiner* — Lenora A Abel
(74) *Attorney, Agent, or Firm* — MARSHALL, GERSTEIN & BORUN LLP

(57) ABSTRACT

Disclosed is a device and a method for storing and transporting at least one human or animal tissue with a view to transplantation or ex vivo experimentation. The device can store such tissue in a specific storage medium until the transplantation or the ex vivo experimentation, and in particular to storing a sample of human or animal cornea, such as a corneal graft. This device for storing at least one human or animal tissue comprises at least one chamber which is suitable for receiving and storing the tissue in a liquid storage medium and which comprises means for continuous renewal of the medium in said at least one chamber. The device additionally comprises means for adjusting at least
(Continued)

Figure 1:
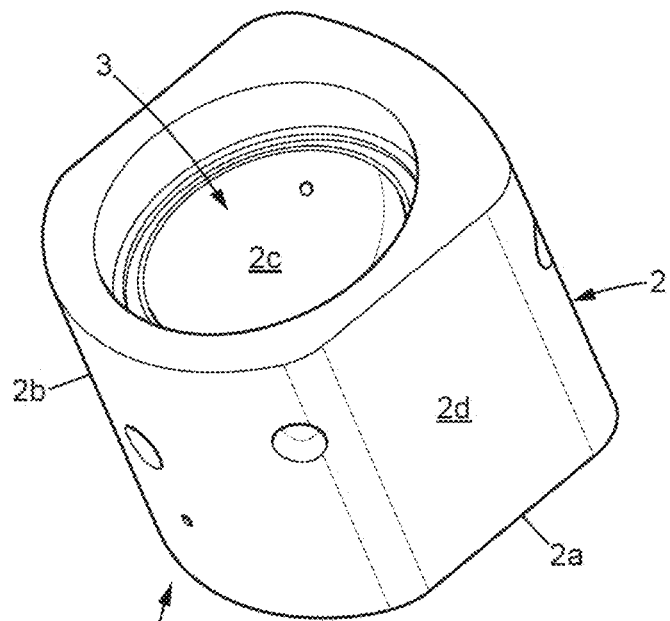

one physicochemical parameter of said medium, including its pH, by continuous circulation of a buffer gas in said at least one chamber outside of and in contact with said medium.

19 Claims, 5 Drawing Sheets

(58) Field of Classification Search
USPC .................................................. 435/284.1
See application file for complete search history.

(56) References Cited

FOREIGN PATENT DOCUMENTS

| WO | WO-2014/188365 A1 | 11/2014 | |
|---|---|---|---|
| WO | WO-2015/021513 A1 | 2/2015 | |
| WO | WO-2015021513 A1 * | 2/2015 | ........... A01N 1/0242 |

OTHER PUBLICATIONS

Les Echos Supplement Special Innovation Article, "TissueAegis is adding value to a patent relating to the transport of human transplant" Journalist: CL.D, Article p. 6, date Jun. 9, 2016.
Edition de Besancon, Besancon: Retrieved from the Internet at <URL:https://www.estrepublicain.fr/edition-de-besancon/2015/06/14/besancon-une-innovation-en-faveur-de-la-greffe-de-cornee> Jun. 14, 2015.
International Search Report and Written Opinion (English Translation of Search Report) for corresponding International application No. PCT/FR2018/050047, dated Apr. 5, 2018.

* cited by examiner

DEVICE AND PROCESS FOR PRESERVING AND TRANSPORTING AT LEAST ONE HUMAN OR ANIMAL TISSUE WITH A VIEW TO TRANSPLANTION OR EX-VIVO EXPERIMENTATION

CROSS REFERENCE TO RELATED APPLICATIONS

This application is the U.S. National Phase of International Patent Application No. PCT/FR2018/050047 filed Jan. 9, 2018, which claims benefit of priority of French Patent Application No. 1750180 filed on Jan. 9, 2017, the respective disclosures of which are each incorporated herein by reference in their entireties.

The present invention relates to a device and a method for storing and transporting at least one human or animal tissue with a view to transplantation or ex vivo experimentation. The invention applies to storing such tissue in a specific storage medium until the transplantation or the ex vivo experimentation, and in particular to storing a sample of human or animal cornea, such as a corneal graft, by way of a non-limiting example.

At present, a corneal graft is stored mainly in two ways:
  cryopreservation (the procedure mostly used in North America, typically at +4° C.): the corneal grafts are stored for a short period (maximum of 10 days) in a specific culture medium, and
  warm organ culture preservation (the method used by most cornea banks in Europe, typically between 31° C. and 37° C.): the corneal graft is stored for a long period (about 5 weeks) by initially being immersed in a sampling medium from the time it is harvested to the time it is received by the cornea bank, where it is immediately transferred into a storage medium of the same nature as the sampling medium but in which the graft is stored for a maximum of 30 days. Two days prior to the transplantation, the graft is placed in what is called a "deturgescence" medium in order to reduce the edema resulting from its storage and in order thereby to make the subsequent surgical procedure easier.

Irrespective of the storage method, the graft is usually immersed in its nutrient liquid inside a vial made of glass or plastic, following the post mortem harvesting. Since the number of living endothelial cells per $mm^2$ conditions its use during transplantation, the endothelial quality of the cornea is monitored by two counts of these cells, which are performed upon receipt of the cornea and upon its immersion in deturgescence medium. These counts require various steps of manipulation of the corneas, for example transfer into Petri dishes, staining with trypan blue, rinsing and, after the living cells have been counted using a microscope, return of the cornea to the vial. However, these manipulations risk external contamination of the cornea and damage to the endothelium.

For simultaneous storage of a large number of corneas, it is known to condition them separately in such vials containing their storage media, which vials are placed in an incubator maintained at the storage temperature. To proceed with a quality control of the corneas that have thus been stored, the operator is obliged to remove the vials one by one from the incubator in order to perform, separately on each cornea, a microscopic examination, a count of the living cells, and a check of the color of the medium, in particular. This results in a considerable amount of time being lost and in a high cost of the quality control overall, in addition to which there is a not inconsiderable risk of deterioration of the corneas due to their manipulation.

The document WO 2014/140434 A1 discloses a device for storing a corneal sample, principally comprising means for receiving and enclosing the corneal sample at an adjustable pressure, with injection and withdrawal of a storage liquid for analyses, means for applanation of the corneal dome, and means for injecting substances into the device, with visual or instrument-based monitoring of the quality of the corneal sample without opening the device. The intended aim of said document is to permit contact between the renewed storage liquid and the two faces of the cornea by defining within the device two chambers, namely an endothelial chamber and an epithelial chamber, independently of the physicochemical parameters of the liquid, none of which parameters is continuously adjusted, which has the disadvantage of a potentially critical deterioration of the storage liquid, which it is difficult to rectify once this deterioration has been detected during quality control.

A vial containing a corneal graft is in fact generally transported at ambient temperature without any monitoring of the storage conditions of the graft, which increases the risk of deterioration of its biological quality since the optimal conditions for its storage, including in particular the pH of the storage medium, are not respected.

Thus, a major disadvantage of the devices and methods of the prior art for storing tissues such as corneas not only lies in the opening and successive manipulations of the vials containing them, for quality control of the tissues, and in their required transfer to other media (in the case of the aforementioned warm storage method), but also in the continuous observance of the storage conditions of the medium.

It is an object of the present invention to make available a device for storing at least one human or animal tissue, for example a corneal sample, with a view to transplantation or ex vivo experimentation, the device comprising at least one chamber which is suitable for receiving and storing said at least one tissue in a liquid storage medium and which comprises means for continuous renewal of said medium in said at least one chamber, which device overcomes the aforementioned disadvantages.

To this end, a device according to the invention is such that the device additionally comprises means for adjusting at least one physicochemical parameter of said medium, including its pH, by continuous circulation of a buffer gas in said at least one chamber outside of and in contact with said medium.

A "buffer gas" is generally understood in the present description as a gas which is able to buffer the storage medium by transforming it into a buffer solution, i.e. into a solution having a substantially constant pH.

It will be noted that this continuous adjustment of the pH of the storage medium, which characterizes a device according to the invention, makes it possible in particular to store the or each tissue (e.g. a corneal graft) in its nutrient medium under optimal conditions, for a period of up to 5 weeks in the case of this corneal graft (i.e. until its transplantation).

It will also be noted that the continuous measurement of the pH, inherent to this adjustment, makes it possible to detect at any time a bacterial contamination of the medium in which the or each tissue is immersed.

According to another feature of the invention, said at least one chamber can have:
  a vessel having a base continued by a peripheral side wall extending from said base, said vessel preferably having a substantially hemispherical inner face, and an at least partially transparent cover mounted on said side wall, said cover preferably being designed for single opening and being provided with means for indicating to an operator that is has previously been opened, and said adjusting means can then comprise delivery and discharge orifices for delivering and discharging said buffer gas, such as carbon dioxide, into and out of said at least one chamber, said delivery and discharge orifices being formed in an upper zone of said side wall adjacent to said cover, in such a way that said buffer gas is delivered to and discharged from said at least one chamber above said medium.

It will be noted that this vessel with a substantially hemispherical inner face is able to minimize the lack of uniformity of the properties of the medium and the potential deterioration of the or each tissue by sharp edges or angles.

It will also be noted that the transparent nature of the cover permits visual measurements for counting the living cells of the or each tissue, via the transparency of the medium.

It will additionally be noted that the or each chamber of a device according to the invention can thus advantageously only be opened once, and that said means indicating to an operator (e.g. a surgeon, a surgeon's assistant, or any other person needing to access the tissue for the subsequent transplantation or ex vivo experimentation) that it has been opened comprise, for example, a tear-off tab that is initially rigidly connected to the cover and also to the side wall of the vessel.

According to another feature of the invention, said adjusting means can additionally comprise:
fluidic couplings for said buffer gas (for example of the Luer type), which communicate respectively with said delivery and discharge orifices and are able to circulate it under pressure and continuously in said at least one chamber, via a circulation unit which the device comprises and which, for example, comprises pumps,
at least one sensor for said at least one physicochemical parameter, communicating with the interior of said at least one chamber and comprising a pH sensor,
optionally a microbiological sensor, for example functionalized and able to detect a given bacterium in said medium, and
optionally at least one opening in said side wall for introduction, into said at least one chamber, of a therapeutic fluid (i.e. a type of medicament with a preventive or curative effect) or non-therapeutic fluid for preserving said at least one tissue and/or for accelerating its tissue regeneration.

It will be noted that the circulation unit that the device comprises can advantageously comprise piezoelectric micropumps, of which the pressure can vary for example from 0 to 600 mbar (i.e. 60000 Pa) for flow rates of 0 to 7 ml/min, for example.

According to another feature of the invention, said means for renewal of said medium can comprise introduction and removal orifices which are able to introduce said medium into and remove it from said at least one chamber, respectively in a direction from a first reservoir of the device, containing said unused medium to be introduced, and toward a second reservoir of the device, containing said used medium once removed, said introduction and removal orifices being formed in said vessel and communicating respectively with two fluidic couplings for said medium (for example also of the Luer type), which are able to circulate said medium under pressure and continuously in said at least one chamber, via said circulation unit.

It will be noted that a device according to the invention thus permits automatic and continuous renewal of the storage medium by virtue of these two fluidic couplings, after the fashion of the continuous circulation of said buffer gas in the chamber permitting buffering of this renewed medium via the two fluidic couplings for this gas.

According to another preferred feature of the invention, the device can additionally comprise a unit for adjusting the temperature of said medium in said at least one chamber to at least one predetermined value of between −20° C. and 50° C., said adjusting unit being mounted outside said at least one chamber against said base and preferably comprising a Peltier module provided with connectors and with a temperature sensor communicating with the interior of said at least one chamber.

This measurement of the temperature is advantageously performed by a thermocouple or another temperature sensor.

Regarding the example of a corneal sample, it will also be noted that its long-term storage (up to 5 weeks) can advantageously be achieved in a temperature range of 0 to 37° C. in the or each chamber.

According to another aspect of the invention, the device can additionally have a transportable unitary casing comprising:
a first recess for receiving, in a removable manner, a thermally insulating block, preferably made of polymer (e.g. of polytetrafluoroethylene), which receives one said chamber which is unitary, of which said vessel is preferably metallic (e.g. made of titanium),
a circulation unit for circulation of said at least one storage medium and said buffer gas in said chamber, preferably comprising pumps (which can be sterilized in an autoclave for re-use under aseptic conditions),
an electrical energy accumulator for the functioning of the device, preferably comprising a battery (permitting a 72-hour charge, for example),
a second recess for receiving, in a removable manner, a first reservoir containing said unused medium to be introduced into said chamber,
a third recess for receiving, in a removable manner, a second reservoir containing said used medium once removed from said chamber,
a microcontroller with memory card, which is able to permit traceability of storage conditions of said at least one tissue, in particular during transport of the device, comprising measured and adjustable values of said at least one physicochemical parameter, of the temperature of said medium and optionally of the microbiological parameters, said card containing data relative to said medium and optionally to said at least one tissue and/or its donor,
means for displaying said storage conditions, preferably comprising a touch screen, and
communication means for communicating with an operator, comprising an antenna for example of the GSM, Wi-Fi, Bluetooth or Zigbee type, said communication means being coupled to said microcontroller and being able to allow the operator to access said storage conditions and modify them, for example by modifying the flow rate and/or the pressure of said buffer gas in order to adjust the pH of said medium.

It will be noted that an operator (i.e. the surgeon or any other person) first of all closes the vessel, containing the sampled tissue bathing in its storage medium, by means of the cover, then seals the unitary storage chamber with a stopper before inserting it into said block in order to reduce heat loss. The assembly composed of chamber and block is then inserted by joining it to the transport casing by way of the "jack" connectors, the chamber being supplied continuously with storage medium and buffer gas during its transport in this casing.

It will also be noted that said second reservoir containing the used medium makes it possible to perform microbiological and biochemical analyses that are necessary for the quality control of the sterility of the tissue, even during its transport.

It will additionally be noted that said memory card can advantageously contain all of the physicochemical parameters relating to the storage medium contained in the transported chamber, and that the electronic system including this microcontroller and these communication means allows all or some of these parameters to be remotely examined and modified by acting in real time, for example, on the buffer gas circulated in the chamber.

Thus, the transportable unitary casing, which the device according to the invention can have for its transport, has the following advantages:
- the tissue to be transplanted (e.g. a corneal graft) can be transported under optimum storage conditions between the site of harvesting and the corresponding tissue bank (e.g. for corneas) and between this bank and the site of transplantation, via the transport (for a maximum period of about 72 hours in the case of a cornea) of the unitary storage chamber containing this tissue immersed in its storage medium, with the temperature of the medium and thus of the tissue being maintained during this transport at a temperature of from −20° C. to 50° C.;
- this casing displays the relevant parameters, including the temperature, the pH and the color of the storage medium, for example on the touch screen, which also makes it possible to modify the setpoints relative to the transport conditions (e.g. temperature of the chamber, flow rate and/or pressure of the storage medium circulating therein, flow rate and/or pressure of the buffer gas circulating therein); and
- this casing registers the data, collected during the transport of the chamber, on the microcontroller card, which has sufficient memory to store all of the aforementioned parameters relating to the chamber and to transmit them to an operator by way of said communication means.

According to a further aspect of the invention, the device can be suitable for simultaneous storage and quality control of several said tissues, and it comprises:
- a plate configured to receive, in a circular or linear arrangement, a plurality of said chambers which are respectively adapted to contain said tissues bathing in said storage media, being identical or different, of which the temperatures and some said physicochemical parameters are adjusted individually,
- a receptacle for at least one said first reservoir and one said second reservoir that are coupled to each of said chambers, and
- analysis means which comprise, for example, a microscope for counting living cells in said tissues and which are mounted movably with respect to said plate (it being possible for these analysis means to comprise any other metrology apparatus).

When received by the bank for the relevant tissues (e.g. the corneal tissue bank), each unitary storage chamber containing the tissue, such as a corneal graft, is supplied (i.e. connected via the connection arrangement on its base wall in order to bring the chamber into communication with the storage medium and buffer gas circuits and the temperature control unit necessary for the growth of the cells) at a location provided for this purpose on the plate of the device, which thus forms a multi-tissue incubator.

Advantageously, said plate can have a surface for receiving chambers, which surface is in the form of a circular crown with an axis of symmetry and has a succession of recesses for the chambers, these recesses being distributed according to said circular arrangement and being adapted for the attachment of said fluidic couplings for said buffer gas and for said medium, said pH sensor and said temperature sensor, and said analysis means, such as said microscope, can then be mounted in rotation on a mobile support centered on said axis of symmetry, mounted underneath the plate and, for example, provided with notches for positioning the analysis means at defined angular positions with respect to said chambers, which are for example arranged according to one said succession of radial pairs of said recesses.

This particular device according to the invention makes it possible in particular to solve the problem of simultaneous storage of several corneal grafts and of their quality control by providing the following functions:
- storage and quality control of several tissues at the same time by virtue of said plate which can contain n unitary storage chambers (n varying for example from 10 to 30), with the temperature of these chambers being maintained (preferably between −20° C. and 50° C.), automatic and continuous renewal of the storage medium in these chambers individually (each chamber being provided with a separate circuit for the circulation of the storage medium, which makes it possible to avoid any risk of contamination of the other chambers), and continuous circulation of said buffer gas in the chambers, likewise individually,
- possibility of sterilization, by autoclave, of said reservoirs containing the storage media and also of the members of the circulation unit (preferably comprising said pumps), in order to permit safe reuse without risk of contamination of the rest of the device,
- real-time registration of the quality control parameters of the stored tissues (e.g. temperature, pH, etc.), which parameters can be consulted on a computer, and
- possibility of future therapy by virtue of the presence of one said first reservoir for each chamber, by injecting an appropriate substance into this first reservoir.

A method according to the invention for storing at least one human or animal tissue, for example a corneal sample, with a view to transplantation or ex vivo experimentation, the method comprising the placement of said at least one tissue in a liquid bath of a storage medium inside at least one chamber in which said medium is continuously renewed, is such that the method comprises continuous circulation of a buffer gas, such as carbon dioxide, in said at least one chamber outside of and in contact with said medium in order to adjust:
- at least one physicochemical parameter of said medium, including its pH, and
- preferably the temperature of said medium to at least one predetermined value of between −20° C. and 50° C.

Advantageously, said buffer gas can be circulated at an adjustable flow rate and partial pressure, preferably, for storage of a cornea, with a molar fraction of carbon dioxide, as buffer gas, of between 2% and 10% and for example between 4% and 6%.

Figure 2:
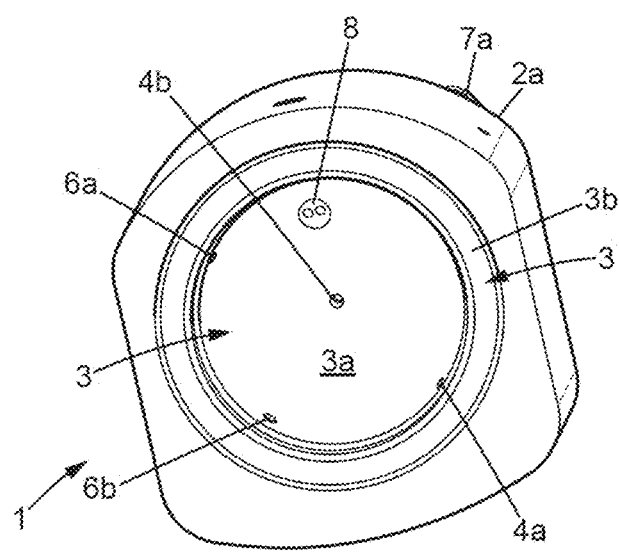
Figure 3:
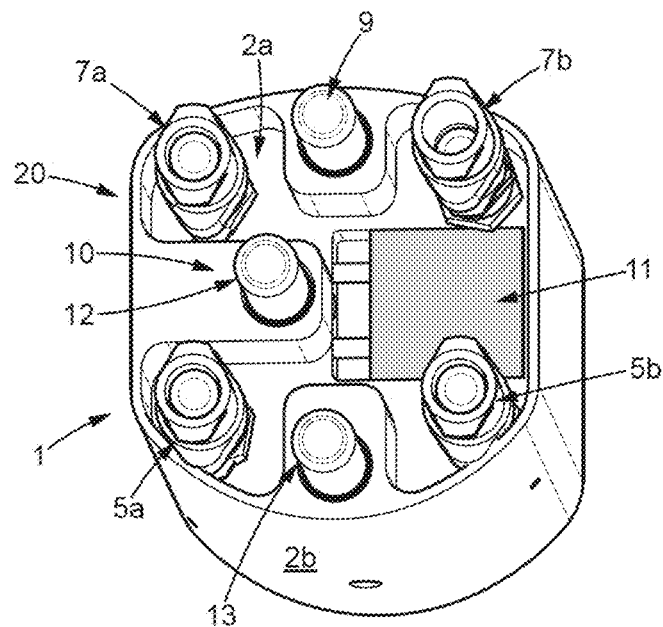
Figure 4:
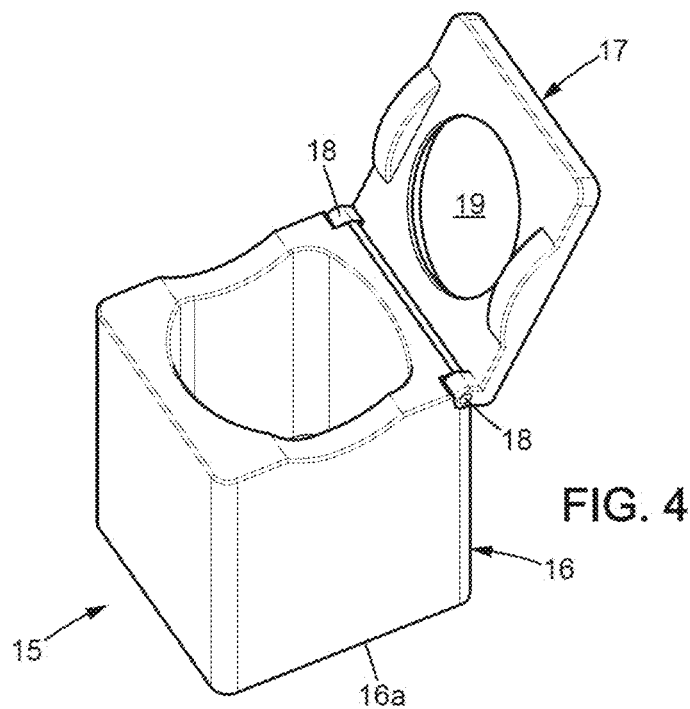
Figure 5:
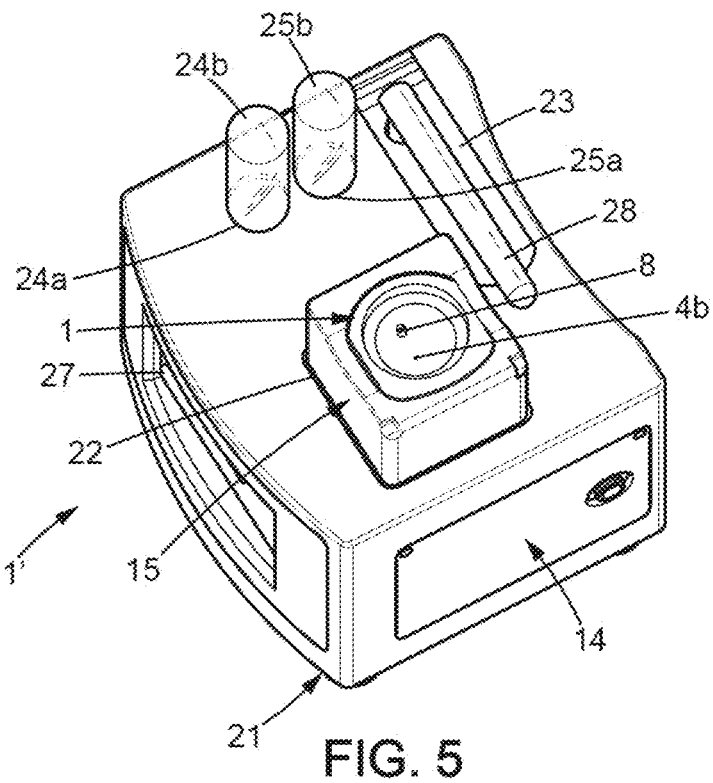
Figure 6:
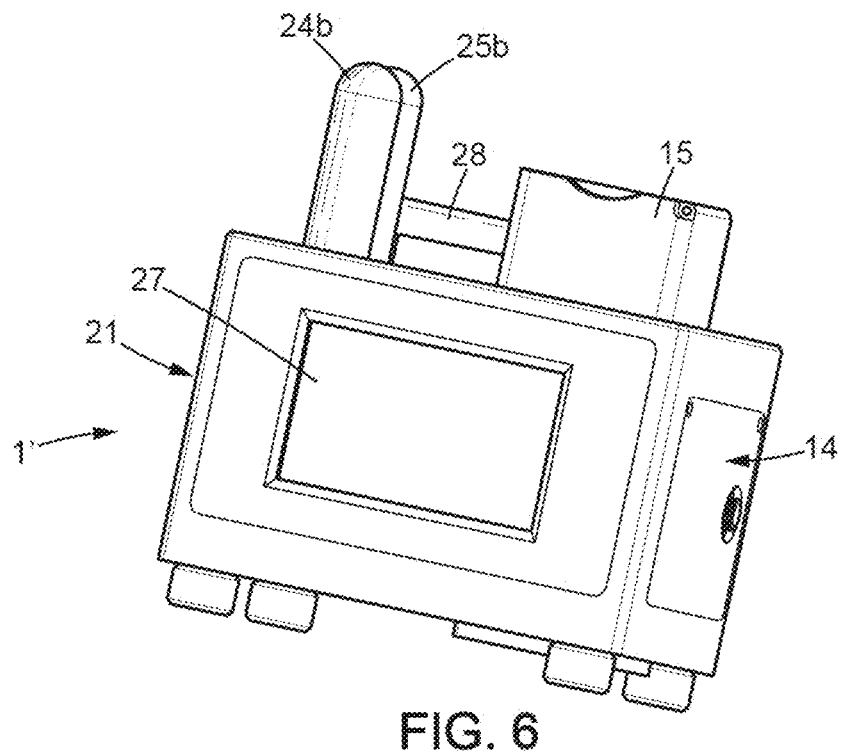
Figure 7:
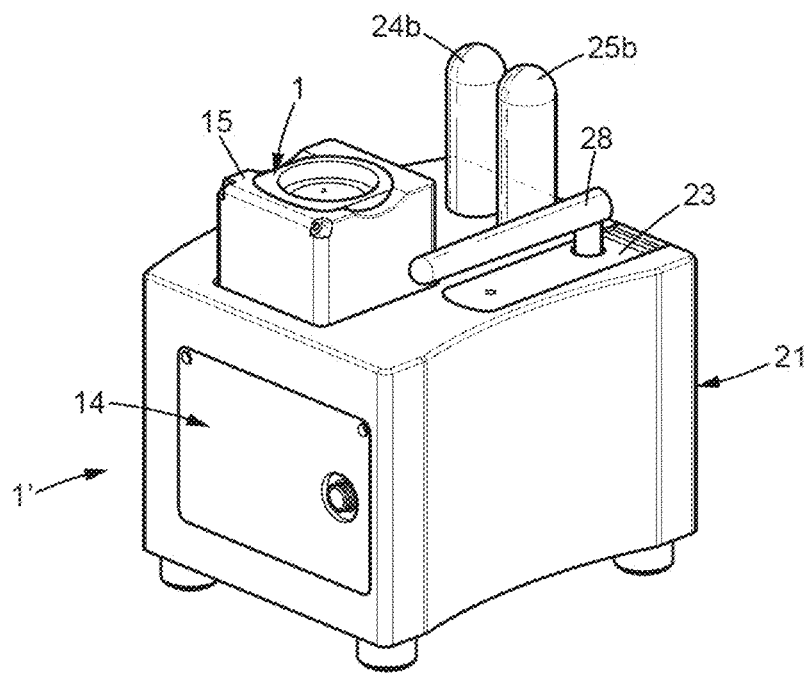
Figure 8:
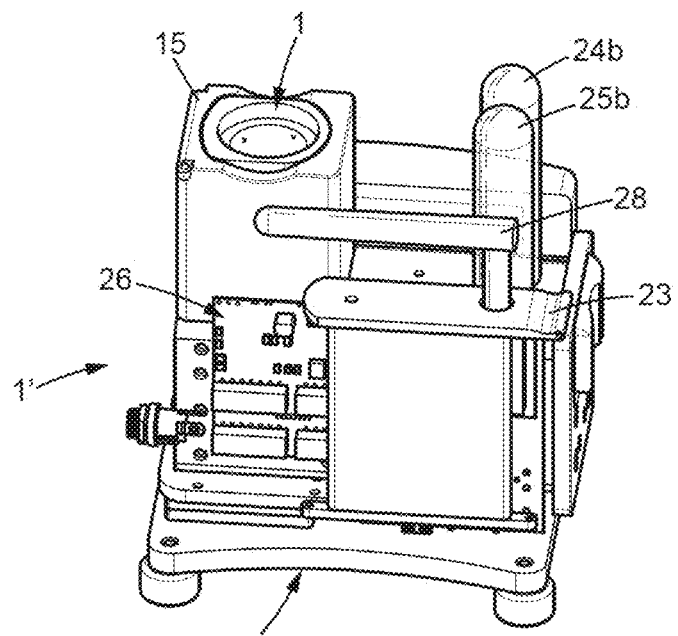
Figure 9:
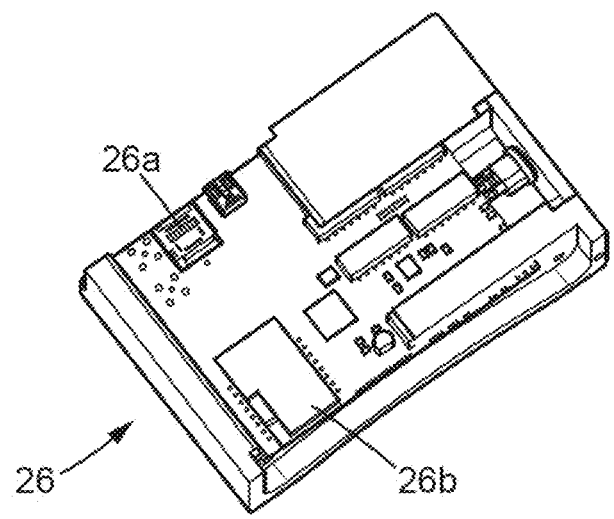
Figure 10:
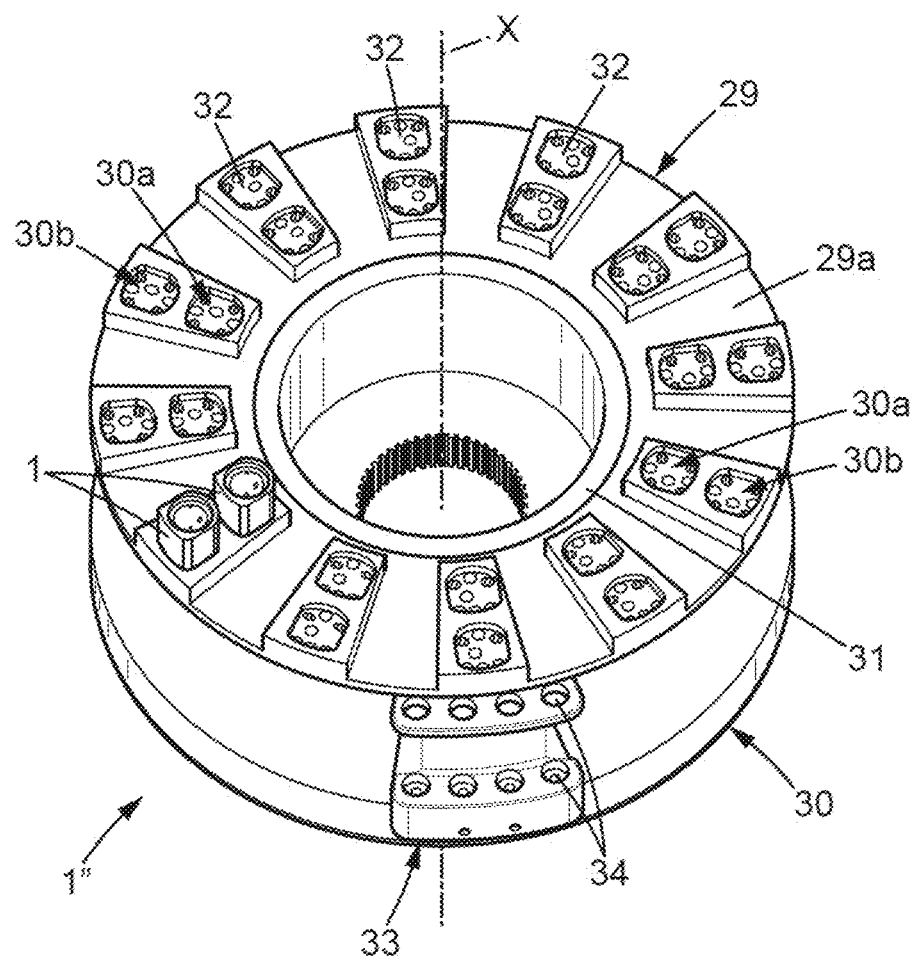

Other features, advantages and details of the present invention will become clear from reading the following description of illustrative embodiments of the invention, which are given purely as examples and are non-limiting, the description being made with reference to the appended drawings in which:

FIG. 1 is a perspective side view of a unitary storage chamber included in a device according to the invention, FIG. 2 is a perspective plan view of the chamber from FIG. 1, FIG. 3 is a perspective bottom view of the chamber from FIG. 1, showing the connection arrangement with which it is provided, FIG. 4 is a perspective side view of a block according to the invention suitable for receiving a chamber according to FIGS. 1 to 3, FIG. 5 is a perspective plan view of a device according to the invention forming a transportable casing that incorporates a chamber according to FIGS. 1 to 3 accommodated in a block according to FIG. 4, FIG. 6 is a perspective front view of the device from FIG. 5, FIG. 7 is a perspective side view of the device from FIG. 6, FIG. 8 is a view similar to FIG. 7, but with the outer walls of the casing removed in order to show some of the internal components, FIG. 9 is a perspective plan view showing an example of a microcontroller such as can be seen in the casing from FIG. 8, and FIG. 10 is a perspective plan view of a device according to another aspect of the invention, forming a multi-tissue incubator suitable for receiving a large number of chambers according to FIGS. 1 to 3.

The unitary storage chamber 1 shown in FIGS. 1-3, which is a main element of a storage device 1', 1" according to the invention, is intended to receive a tissue, such as a cornea, immersed in a bath of a liquid storage medium specific to this tissue, and comprises:

- a vessel 2 made of metal (for example titanium), having a base 2a continued by a peripheral side wall 2b extending from the base 2a, the vessel 2 having a substantially hemispherical inner face 2c, and the side wall 2b having a generally convex outer face 2d (defined in this example by two opposite convex sides, in the form of arcs of a cylinder, connected to each other by two flat sides via rounded connection zones), and
- an at least partially translucent or transparent cover 3 (comprising for example a window 3a made of glass or of another material such as sapphire) which is locked, with a view to single opening, on an upper part of the inner face 2c of the side wall 2b adapted for this locking, via retention means 3b which are able to indicate to an operator that it has previously been opened (for example by the rupture of a tear-off tab (not shown)).

In this vessel 2 are formed (see FIG. 2):

- in the side wall 2b and in the base 2a, respectively, an introduction orifice 4a and a removal orifice 4b (i.e. outlet orifice) for the storage medium, which communicate respectively with fluidic couplings 5a and 5b, for example of the Luer type, which are mounted in a sealed manner against the outer face of the base 2a and extend through the latter (see FIG. 3),
- in an upper zone of the side wall 2b situated immediately below the retention means 3b of the cover 3, delivery and discharge orifices 6a and 6b for delivering and discharging a buffer gas, such as $CO_2$, into and out of the chamber 1, which orifices likewise communicate with fluidic couplings 7a and 7b, for example of the Luer type, which are mounted in a sealed manner against the outer face of the base 2a and extend through the latter (see FIG. 3),
- in the base 2a or in a lower zone of the side wall 2b, a sensor 8 for the pH of the storage medium (preferably a potentiometric microsensor) which communicates with a connector 9 mounted against and through the base 2a, and
- a unit 10 for adjusting the temperature of the medium in the chamber 1 to a predetermined value of between −20° C. and 50° C., which adjusting unit is mounted against the outer face of the base and comprises a Peltier module 11 (see FIG. 3) provided with a first connector for this module and a second connector 13 for a temperature sensor communicating with the interior of the chamber 1.

The Peltier module 11 uses, in a known manner, the thermoelectric effect, a physical phenomenon of heat displacement in the presence of an electric current. In the devices 1', 1" of the invention that are illustrated in FIGS. 4-8 and 10, this module 11 uses an electronic component which makes it possible to obtain a maximum temperature by applying a positive voltage to it, and a minimum temperature by inversion of this voltage at its terminals. As an example of a use for storage of a cornea, testing was carried out on a Peltier module 11 manufactured by Adaptive under the reference ET-071-10-13-RS, type 21.2 W-3.9 A-8.8 V-20×20 mm. This module 11 was equipped with a feedback loop composed of a thermocouple and of a microcontroller, in order to ensure adjustment of the temperature of the storage medium to a setpoint temperature of between −20° C. and 50° C. in the context of the invention.

The devices 1' and 1" each additionally comprise a circulation unit 14 (see FIGS. 5-7) for circulating the storage medium and the buffer gas via the fluidic couplings 5a, 5b and 7a, 7b and orifices 4a, 4b and 6a, 6b, which circulation unit 14 preferably comprises pumps. Testing was carried out particularly on piezoelectric pumps (Mp6 Micropump from Bartels Mikrotechnmik, with two piezoelectric actuators in the same recess) for renewal of the storage medium, with a pressure applied to the liquid or the gas of 0 to 600 mbar (0 to 60000 Pa) for flow rates of 0 to 7 ml/min (it being noted that the pressure may reach several bar when the pumps are mechanical).

As regards the buffer gas circulated in the chamber 1, $CO_2$ in particular was tested for storage of a cornea, using a molar fraction of 5% $CO_2$ in the temperature-controlled humid atmosphere of the chamber 1, i.e. with the partial pressure of $CO_2$ following the atmospheric pressure of 790 mm Hg (i.e. $1013.10^5$ Pa): $P_{CO2}=0.05 \cdot 760$ (mmHg)=38 mmHg (i.e. about 5065 Pa).

As has been explained above, the continuous circulation of this buffer gas in the chamber 1 above and in contact with the storage medium contained in the chamber 1 (i.e. avoiding a circulation of the gas directly within the storage liquid) makes it possible to continuously adjust the pH of the medium, in order to store the tissue in its nutrient medium under optimal conditions up to the time of the transplantation (for example for a period that can be up to 5 weeks in the case of a cornea). Moreover, by continuous measurement of the pH of the storage medium in which the tissue is immersed, it is possible at any time to detect bacterial contamination of this medium.

The tests carried out by the applicant have thus established that a molar fraction of $CO_2$ equal to 5% makes it possible to maintain a substantially constant optimal pH for a storage medium called CorneaMax® from Eurobio containing a corneal graft and of which the temperature was adjusted to 31° C. by the aforementioned Peltier module ET-071-10-13-RS (this adjustment to 31° C. is particularly suitable for the practice of European cornea banks, it being noted that it is possible to adjust the temperature of the medium to a much lower temperature of only 4° C. for example, following the practice in North America).

FIG. 4 shows the structure of a thermally insulating block 15 (e.g. made of Teflon®) comprising a substantially cuboid container 16 provided with a block cover 17 (shown empty and in the open position) which is articulated via hinges 18 and which has a translucent or transparent window 19, after the fashion of the cover 3 of the chamber 1 that the block 15 is intended to receive after closure and sealing of the cover 3 of the chamber 1. The connection arrangement 20 of the chamber 1 (as can be seen in FIG. 3, this connection arrangement 20 comprises in particular the couplings 5a, 5b, 7a, 7b and the connectors 9, 12-13, moreover a battery and a memory card (which are not shown)) passes through the base wall 16a of the container 16, so as to allow the connection arrangement 20 to be supplied for performing the storage of the tissue and recording the storage conditions during the transport of the chamber 1 by means of the block 15.

According to another aspect of the invention, the block 15 containing the chamber filled with the tissue bathing in its storage medium is itself connected to a transportable unitary casing 21 that a device 1 according to the invention can comprise.

As is illustrated in FIGS. 5 to 8, the casing 21 comprises in particular:
- a recess 22 receiving the block 15 in which is accommodated and connected a unitary chamber 1 for circulation of the storage medium and of the buffer gas and for adjustment of the temperature of the medium,
- the circulation unit 14 for circulation of the storage medium and of the buffer gas in the chamber 1,
- an electric battery (identified by its access hatch 23) for the functioning of the device 1' (permitting a 72-hour charge, for example),
- a recess 24a receiving a first tubular reservoir 24b containing the "fresh" (i.e. unused) storage medium to be introduced into the chamber 1,
- a recess 25a receiving a second tubular reservoir 25b containing the used storage medium removed from the chamber 1,
- a microcontroller 26 with memory card 26a (see FIGS. 8 and 9) for traceability of the storage conditions of the tissue in particular during the transport of the device 1', comprising measured and adjustable values of the pH, of the temperature of the medium and optionally of microbiological parameters (the card 26a containing data relative to the medium and optionally to the tissue and/or its donor),
- a screen 27, for example a touch screen, for displaying the storage conditions, and
- an antenna 28, for example a GSM, Wi-Fi, Bluetooth or Zigbee antenna, for communicating the storage conditions to the operator via the microcontroller 26, and such that this operator can modify them, for example by modifying the flow rate and/or the pressure of the buffer gas in order to adjust the pH of the medium (an increase in the flow rate of buffer gas allowing the setpoint pH to be recovered by "rinsing") in the event of a pH alert emitted by the device 1'.

The memory card 26a of the microcontroller 26, shown in detail in FIG. 9, is for example an SSD memory (Solid State Drive, i.e. flash memory disk), and it can be coupled to a module 26b of the GSM and Wi-Fi type.

As has been explained above, by virtue of the intact presence of said means for indicating opening of the cover (for example a tear-off tab) and by virtue of the memory card 26a of the microcontroller 26 registering the storage conditions of the tissue, an operator such as a surgeon who opens the unitary storage chamber 1 knows that he can proceed with the planned transplantation or ex vivo experimentation using the tissue thus stored.

The device 1" according to another aspect of the invention illustrated in FIG. 10 forms a multi-tissue incubator permitting simultaneous storage and quality control of a multiplicity of tissues. For this purpose, this device 1" is configured to hold a multiplicity of unitary storage chambers 1 (only two chambers 1 are shown), each containing the tissues bathing in their storage media, of which the temperatures and the pH in particular are individually adjusted. In this example, the chambers 1 are mounted on a circular plate 29 equipped with analysis means which comprise, for example, a miniaturized microscope (not shown) for counting the living cells in the tissues and which are mounted below the plate 29 and are movable in rotation with respect to the plate 29, via notches 31 for positioning these analysis means according to determined angular positions with respect to the chambers 1.

The plate 29 has a surface 29a for receiving the chambers 1, which surface 29a is in the form of a circular crown with a succession of recesses 30a and 30b for the chambers, said recesses being distributed in radial pairs (with respect to the axis X) according to a circular arrangement. As can be seen from FIG. 10, each recess 30a, 30b is adapted for the attachment of the connection arrangement 20 of the chambers 1 through the plate 29 via sockets 32 formed in these recesses 30a and 30b, so as to ensure and maintain the storage conditions required for the tissues once they are received by the corresponding tissue bank (in particular via the circuits for storage medium and for buffer gas and the temperature control unit 10).

The example in FIG. 10a also shows a receptacle 33 which defines two pairs of placements 34 for four reservoirs 24b and 25b and which is, for example, connected to the support 30 for conjoint rotation. Each pair of placements 34 is intended to receive a first tubular reservoir 24b (unused medium) and a second tubular reservoir 25b (used medium) for one of the two chambers 1 of each pair of radial chambers 1.

The invention claimed is:

1. A device (1', 1") for storing at least one human or animal tissue with a view to transplantation or ex vivo experimentation, the device comprising at least one chamber (1) for receiving and storing said at least one tissue in a liquid storage medium and which comprises means (4a and 4b, 5a and 5b) for continuous renewal of said medium in said at least one chamber, wherein the device additionally comprises a circulation unit and an adjusting means (6a and 6b, 7a and 7b) for adjusting at least one physicochemical parameter of said medium, including its pH, by continuous circulation of a buffer gas in said at least one chamber outside of and in contact with said medium, wherein said adjusting means comprises: —two delivery and discharge orifices (6a and 6b) for respectively delivering and discharging said buffer gas into and out of said at least one chamber, in such a way that said buffer gas is delivered to and discharged from said at least one chamber above said medium, and —two fluidic couplings (7a and 7b) for said buffer gas, which communicate respectively with said two delivery and discharge orifices (6a and 6b) and which are able to circulate said buffer gas under pressure and continuously in said at least one chamber (1), via the circulation unit (14), wherein said at least one chamber (1) comprises: a vessel (2) having a base (2a) and a peripheral side wall (2b) extending from said base, and an at least partially translucent or transparent cover (3) mounted on said side wall, wherein said two delivery and discharge orifices (6a and 6b) for the buffer gas are formed in an upper zone of said side wall (2b) adjacent to said cover (3), and wherein said two fluidic couplings (7a and 7b) for the buffer gas are mounted in a sealed manner against an outer face of the base (2a) and extend through the base (2a).

2. The device (1', 1") as claimed in claim 1, wherein said adjusting means (6a and 6b, 7a and 7b) additionally comprise: —at least one sensor for said at least one physicochemical parameter, communicating with the interior of said at least one chamber and comprising a pH sensor (8), —optionally a microbiological sensor, able to detect a given bacterium in said medium, and —optionally at least one opening in said side wall for introduction, into said at least one chamber, of a therapeutic fluid or non-therapeutic fluid for preserving said at least one tissue and/or for accelerating its tissue regeneration, wherein said circulation unit (14) comprises pumps.

3. The device (1', 1") as claimed in claim 2, wherein said means (4a and 4b, 5a and 5b) for renewal of said medium comprise introduction and removal orifices (4a and 4b) which are able to introduce said medium into and remove it from said at least one chamber (1), respectively from the direction of a first reservoir (24b) of the device, containing said unused medium to be introduced, and toward a second reservoir (25b) of the device, containing said used medium once removed, said introduction and removal orifices being formed in said vessel (2) and communicating respectively with two fluidic couplings (5a and 5b) for said medium, which are able to circulate said medium under pressure and continuously in said at least one chamber, via said circulation unit (14).

4. The device (1', 1") as claimed in claim 1, wherein the device additionally comprises a unit (10) for adjusting the temperature of said medium in said at least one chamber (1) to at least one predetermined value of between −20° C. and 50° C., said adjusting unit being mounted outside said at least one chamber against said base (2a).

5. The device (1') as claimed in claim 1, wherein the device additionally has a transportable unitary casing (21) comprising: —a first recess (22) for receiving, in a removable manner, a thermally insulating block (15), which receives said chamber (1), —a circulation unit (14) for circulation of said at least one storage medium and said buffer gas in said chamber, —an electrical energy accumulator (23) for the functioning of the device, —a second recess (24a) for receiving, in a removable manner, a first reservoir (24b) containing said unused medium to be introduced into said chamber, —a third recess (25a) for receiving, in a removable manner, a second reservoir (25b) containing said used medium once removed from said chamber, —a microcontroller (26) with memory card (26a), which is able to permit traceability of storage conditions of said at least one tissue, in particular during transport of the device, comprising measured and adjustable values of said at least one physicochemical parameter, of the temperature of said medium and optionally of microbiological parameters, said card containing data relative to said medium and optionally to said at least one tissue and/or its donor, —means (27) for displaying said storage conditions, and —communication means (28) for communicating with an operator, said communication means being coupled to said microcontroller and being able to allow said operator to access said storage conditions and modify them.

6. The device (1") as claimed in claim 3, wherein the device is suitable for simultaneous storage and quality control of several said tissues, the device comprising: —a plate (29) configured to receive, in a circular or linear arrangement, a plurality of said chambers (1) which are respectively adapted to contain said tissues bathing in said storage media, being identical or different, of which the temperatures and some said physicochemical parameters are adjusted individually, —a receptacle (33) for at least one said first reservoir (24b) and one said second reservoir (25b) that are coupled to each of said chambers, and —analysis means which are mounted movably with respect to said plate.

7. The device (1") as claimed in claim 6, wherein said plate (29) has a surface (29a) for receiving said chambers (1), which is in the form of a circular crown with an axis of symmetry (X) and which has a succession of recesses (30a and 30b) for said chambers, said recesses being distributed according to said circular arrangement and being adapted for the attachment of said fluidic couplings for said buffer gas (7a and 7b) and for said medium (5a and 5b), said pH sensor (8) and said temperature sensor, and wherein said analysis means are mounted in rotation on a mobile support (30) centered on said axis of symmetry, mounted underneath said plate.

8. The device (1', 1") as claimed in claim 1, wherein said at least one human or animal tissue is a corneal sample.

9. The device (1', 1") as claimed in claim 1, wherein said vessel has a substantially hemispherical inner face (2c).

10. The device (1', 1") as claimed in claim 1, wherein said cover (3) is designed for single opening and is provided with means (3b) for indicating to an operator that is has previously been opened.

11. The device (1', 1") as claimed in claim 1, wherein said buffer gas is carbon dioxide.

12. The device (1', 1") as claimed in claim 2, wherein said circulation unit (14) comprises pumps.

13. The device (1', 1") as claimed in claim 2, wherein said adjusting means (6a and 6b, 7a and 7b) additionally comprise —said microbiological sensor which is functionalized and able to detect a given bacterium in said medium, and —said at least one opening in said side wall for introduction, into said at least one chamber, of a therapeutic fluid or non-therapeutic fluid for preserving said at least one tissue and/or for accelerating its tissue regeneration.

14. The device (1', 1") as claimed in claim 4, wherein said adjusting unit (10) for adjusting the temperature of said medium in said at least one chamber (1) comprises a Peltier module (11) provided with connectors (12 and 13) and with a temperature sensor communicating with the interior of said at least one chamber.

15. The device (1') as claimed in claim 5, wherein: —said thermally insulating block (15) is made of polymer, said vessel (2) of said chamber (1) being metallic, —said circulation unit (14) comprises pumps, —said electrical energy accumulator (23) comprises a battery, —said means (27) for displaying said storage conditions comprise a touch screen, and —said communication means (28) for communicating with an operator comprise an antenna and are able to allow said operator to access said storage conditions and modify them, by modifying the flow rate and/or the pressure of said buffer gas in order to adjust the pH of said medium.

16. The device (1″) as claimed in claim 6, wherein said analysis means comprise a microscope for counting living cells in said tissues.

17. The device (1″) as claimed in claim 7, wherein said mobile support (30) is provided with notches (31) for positioning said analysis means at defined angular positions with respect to said chambers, which are arranged according to one said succession of radial pairs of said recesses.

18. The device as claimed in claim 1, wherein said means for renewal of said medium comprise —two introduction and removal orifices (4a and 4b) respectively for introducing said medium into and remove it from said at least one chamber, said two introduction and removal orifices being formed in said vessel, and —two fluidic couplings (5a and 5b) for said medium which are distinct from said two fluidic couplings (7a and 7b) for the buffer gas and which communicate respectively with said two introduction and removal orifices.

19. The device as claimed in 18, wherein said two introduction and removal orifices (4a and 4b) are formed in the side wall (2b) and in the base (2a), respectively, and wherein said two fluidic couplings (5a and 5b) for said medium are mounted in a sealed manner against the outer face of the base (2a) and extend through the base (2a).

\* \* \* \* \*